United States Patent [19]

Robbins

[11] 4,092,197

[45] May 30, 1978

[54] METHOD OF SECURING A THERMOPLASTIC COVERING TO A GROOVED BLOCK

[76] Inventor: Edward S. Robbins, P.O. Box 2386, Muscle Shoals, Ala. 35660

[21] Appl. No.: 614,158

[22] Filed: Sep. 17, 1975

Related U.S. Application Data

[62] Division of Ser. No. 329,200, Feb. 2, 1973, abandoned.

[51] Int. Cl.$^2$ .................. B29C 17/04; B32B 31/30
[52] U.S. Cl. .................. 156/212; 52/309.11; 156/244.11; 156/267; 156/286; 156/322
[58] Field of Search ............ 156/267, 285, 382, 211, 156/212, 213, 244, 286, 497, 216, 40, 322; 52/444, 453, 596, 309, 605–607, DIG. 7

[56] References Cited

U.S. PATENT DOCUMENTS

| | | | |
|---|---|---|---|
| 941,792 | 11/1909 | Meeker | 156/538 |
| 3,154,453 | 10/1964 | Demke et al. | 156/212 |
| 3,202,561 | 8/1965 | Swanson et al. | 156/286 |
| 3,325,329 | 6/1967 | Bolesky | 156/285 |
| 3,660,214 | 5/1972 | Nichols, Jr. et al. | 156/298 X |
| 3,697,369 | 10/1972 | Amberg et al. | 156/224 X |

*Primary Examiner*—William A. Powell
*Assistant Examiner*—M. G. Wityshyn
*Attorney, Agent, or Firm*—Cushman, Darby & Cushman

[57] ABSTRACT

The disclosure embraces a method of securing a protective thermoplastic sheet to a surface of a building block which is provided with a locking groove on its side surfaces, the method including the steps of placing the block in a receptacle and passing the block and receptacle beneath a device for supplying a heated thermoplastic sheet which covers the surface of the block and the opening of the receptacle, drawing a vacuum in the receptacle to pull the sheet material securely into the groove formed in the block so that when the sheet material cools, it will be securely anchored in the locking groove provided on the block.

2 Claims, 13 Drawing Figures

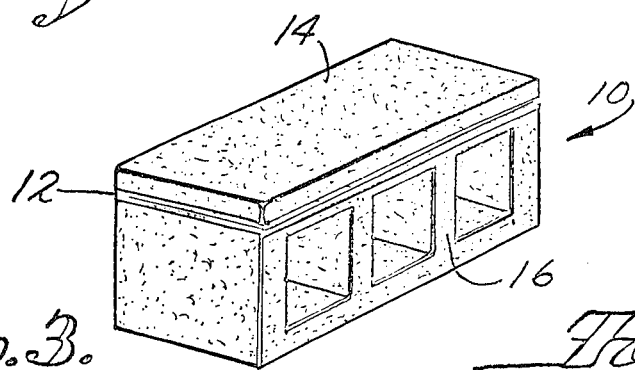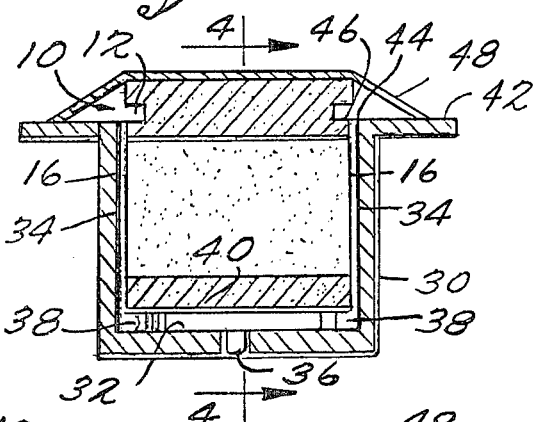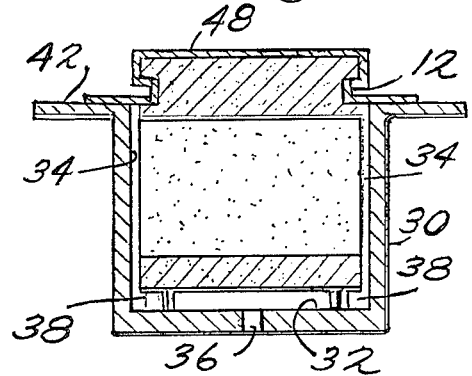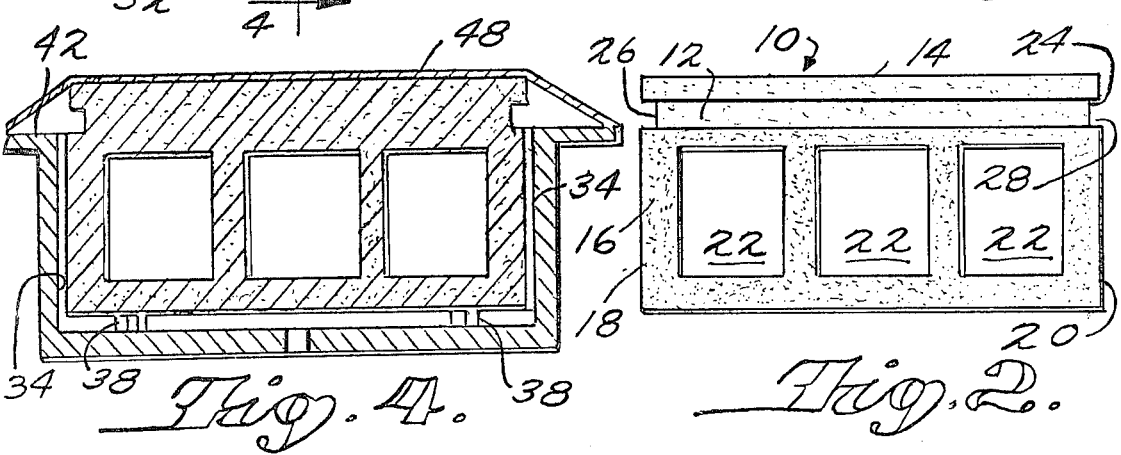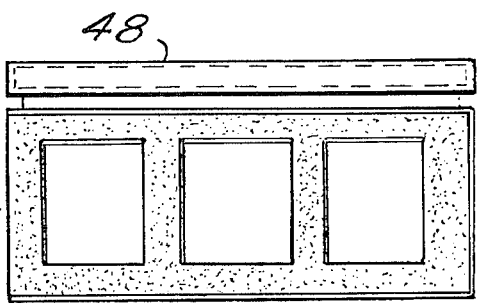

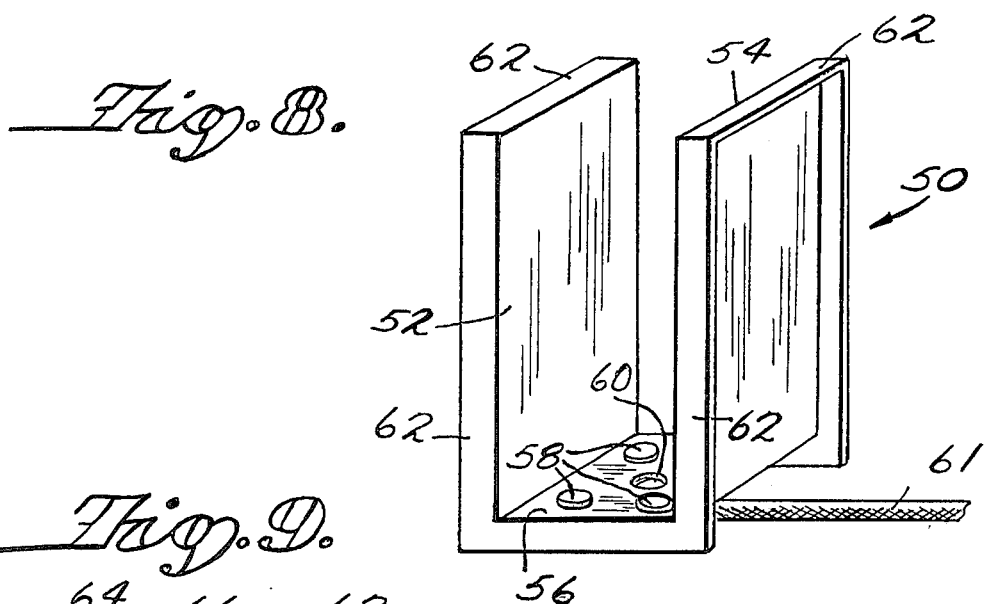
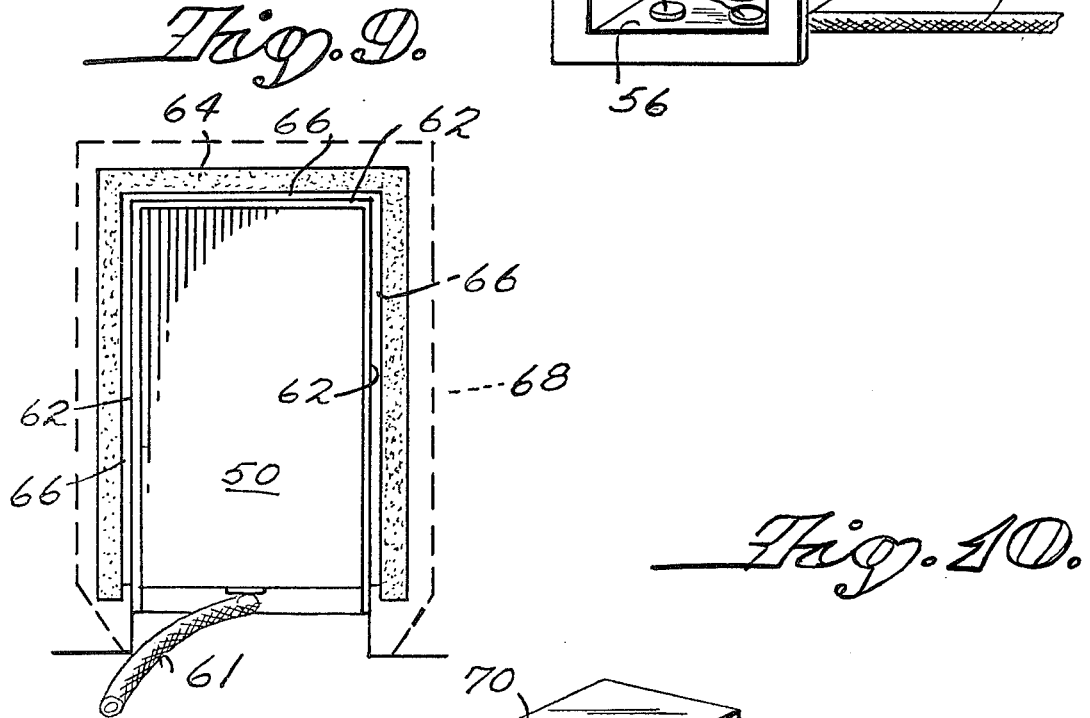
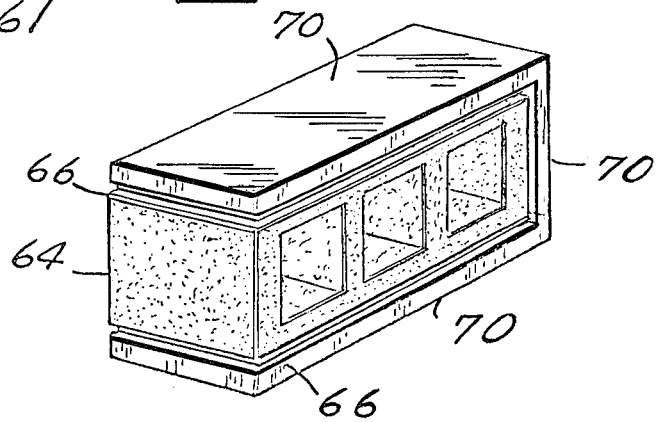

METHOD OF SECURING A THERMOPLASTIC COVERING TO A GROOVED BLOCK

BACKGROUND AND BRIEF DESCRIPTION OF THE INVENTION

This is a division of application Ser. No. 329,200 filed Feb. 2, 1973, now abandoned.

The present invention relates to construction materials and more particularly to protective or decorative coverings for block-type articles made of crushed cinder, glass, concrete, wood or clay.

In the building industry, it has long been recognized that it is desirable to provide masonry building blocks with protective coatings both for the purposes of extending the useful life of these materials as well as to improve their appearance where such blocks are exposed to view.

Cinderblocks, cement blocks, asbestos-cement blocks or the like have gained widespread acceptance in the building industry because of their ready availability and relatively low cost. One factor contributing to the relatively low cost of these construction blocks is the cheapness of the materials from which they are constituted. As a result, with the particular case of cinderblocks, for example, the surface of the blocks have a very rough character thus rendering painting or cleaning of the blocks a very time consuming endeavor.

As a result of the materials used in the construction of the blocks, it became apparent to workers in this field at an early time that suitable coatings or coverings would have to be applied to at least one surface of the blocks both to improve their appearance and to render them impervious to moisture and decay causing chemicals where such blocks were used in the subterranean foundations of building structures.

One of the most common solutions of the foregoing problem has consisted in the application of a thermosetting resin to one or more surfaces of the block such as, for example, in the U.S. Pat. Nos. to Sergovic, 2,751,775 of June 26, 1956 and 3,194,724 of July 13, 1965 and McClinton, 3,030,234, of Apr. 17, 1962. The coverings disclosed in the foregoing references, while generally providing a suitable protective layer, have suffered from the disadvantage that they have required that the article being covered be heated to obtain the best results.

In general the prior art attempts to provide coverings to the surfaces of modular elements have been directed to attempts to impregnate one or more surfaces of the blocks with a thermosetting or thermoplastic material which, at the outset of the process is in a liquid state. Subsequently, for the thermosetting materials, the process is completed by curing the coating either by the application of heat or by simply allowing the block with the coating material to stand at room temperature for a suitable amount of time. The thermoplastic materials, of course, harden upon cooling.

While the foregoing practices of the prior art have provided suitable coatings, the obtaining of such coatings has generally been time consuming chiefly in view of the emphasis placed upon filling the interstices of the block surfaces with the coating material.

The present invention avoids the foregoing and other disadvantages of the prior art methods while providing an extremely efficient method of covering one or more surfaces of a masonry block having a slightly modified construction, which covering will provide a durable, protective and, if desired, a decorative face for the block surface. In addition, the method of the present invention can be carried out at a substantially reduced cost relative to the processes of the prior art which is a factor of prime importance in the contemporary building trades. Also, with the method of the present invention, a building contractor can effect covering of the building blocks at the construction site itself thus eliminating the need for precisely calculating the number of covered blocks in advance that would have to be ordered from a supplier.

In summary, in one embodiment, the method of the present invention consists in placing a block that is provided with a locking groove about its exterior surface in an open top receptacle. The floor of the receptacle is provided with spacing studs on which the bottom of the block rests so as to be separated a small distance from the floor. The walls of the receptacle which extend upwardly from its floor are spaced apart a distance such that when the block is placed in the receptacle a small space will be provided between the exterior surfaces of the block and the interior walls of the receptacle. For the sake of efficiency, the lower edge of the locking groove of the block should be positioned so as to extend parallel to and co-planar with the top edges of the walls of the receptacle. A thermoplastic sheet having sufficient surface area to completely cover the exposed surface of the block, the locking groove and overlap the edges of the walls of the receptacle is heated to a temperature sufficient to render it deformable. The thickness of the sheet should be such that when at room temperature the sheet is relatively stiff. However, it should be understood that it is only necessary that the sheet be thick enough so that when heated and deformed, the sheet will retain its deformed configuration. The heated sheet is then draped over the exposed surface of the block in the receptacle and the interior of the receptacle which is connected to a vacuum line is exhausted to remove the air from the interior of the receptacle. The application of the vacuum to the interior of the receptacle has the effect of pulling the pliable thermoplastic sheet material into intimate contact with the locking groove of the block. It will be apparent that the application of the vacuum must be effected relatively rapidly after the sheet is draped over the block and preferably immediately. Subsequently, upon cooling, the thermoplastic sheet material hardens and that portion of the sheet material that is engaged in the locking groove functions as an anchor for the material thus providing a secure attachment of the sheet material to the block.

In addition to the advantages flowing from the improved type of covering provided by the present invention, it will be apparent that the method of the present invention readily lends itself to mass production in a completely automated system being capable of a high production output at a very low cost per unit produced. Additional advantages will be set forth and will become apparent to those skilled in this art in the detailed description which follows and in this description reference will be had to the accompanying drawings in which:

BRIEF DESCRIPTION OF THE DRAWINGS

FIG. 1 is a view in perspective of one embodiment of a construction block used in carrying out the method of the present invention;

FIG. 2 is side view in elevation of the block of FIG. 1;

FIGS. 3, 4 and 5 illustrate the method of the present invention as carried out with a receptacle dimensioned to receive the block of FIGS. 1 and 2; and FIGS. 6 and 7 are end and side views in elevation, respectively, of the product obtained by use of the method of this invention.

FIG. 8 is a perspective view of another embodiment of the receptacle used in carrying out the method of the present invention where more than one surface of a block is to be covered;

FIG. 9 is a side elevational view of the receptacle of FIG. 8 with a modified construction block disposed in the receptacle with the locking grooves exposed; and FIG. 10 is a perspective view of a block with a thermoplastic covering attached to three sides thereof by carrying out the method of the present invention with the receptacle illustrated in FIGS. 8 and 9.

DETAILED DESCRIPTION OF THE INVENTION

Figure 11:
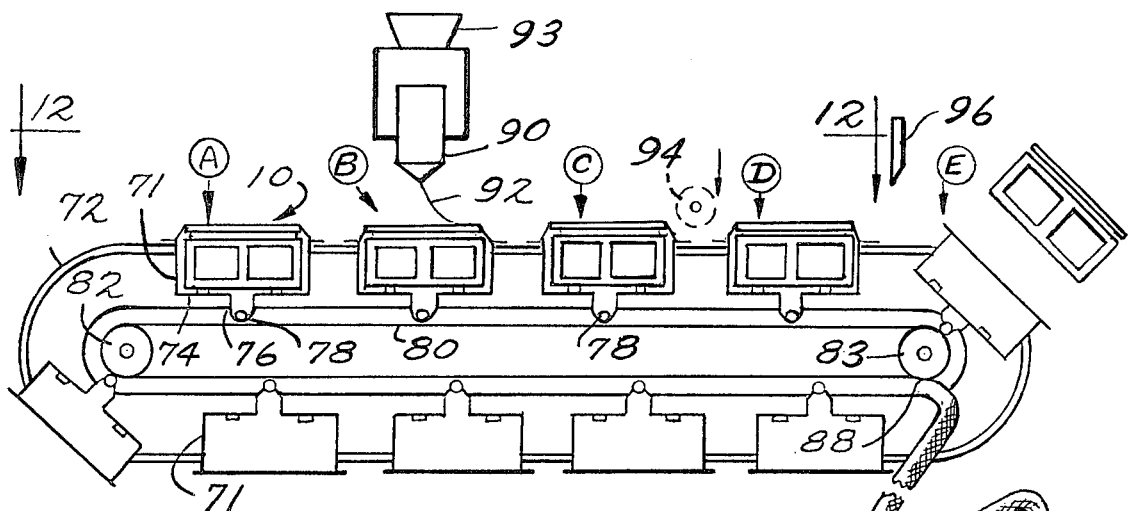
FIG. 11 is a side view in elevation of schematic illustration of one application of the method of the present invention in a continuous process.

With reference now to the drawings, there is illustrated in FIG. 1 a perspective view of a construction module 10 formed with a locking groove 12 about its periphery. It will be understood that the block 10 may be constructed from any type of material such as cinder, asbestos-cement, cement, wood, glass or even metal and that the block may be of any desired shape or dimension. It should also be noted that the exterior surfaces of the block need not be flat. As pointed out hereinafter, however, it is necessary that the surface to be covered be so shaped that it can be circumscribed by a locking groove where the opposite sides of the groove do not lie in the same plane as the surface to be covered.

In the illustrated embodiment as shown in FIG. 2, the block 10 is provided with a surface 14 which, when the block 10 is placed in a wall or other construction will be exposed whereas the surfaces, one of which is shown at 16, which extend perpendicular from surface 14 will generally be covered by adjacent blocks of the building structure. Similarly the end surfaces 18 and 20 of the block 10 will also generally be concealed by adjacent blocks or border material used in a conventional structure. With the exception of the locking groove 12 which is formed in the surfaces which extend perpendicularly from the surface 14 which it is desired to cover, the block 10 is of conventional construction and is provided with transverse channels 22 which serve to reduce the weight of the block 10 and provide some degree of insulation in the resulting structure.

The locking groove 12 is formed with a first surface 24 which extends generally parallel to the surface 14, a second surface 26 which extends generally perpendicularly to surface 14 and set back a distance from the plane in which extends its associated side surface such as 16, 18 or 20. The locking groove is completed by the third surface 28 which extends parallel to the first surface 24.

In a preferred embodiment, it has been found desirable to provide three surfaces for the locking groove with two of the surfaces 24 and 28 extending perpendicular to the second surface 26 so that the locking groove will have a generally square configuration. It should be understood however that a groove that is V-shaped in cross-section or is deeply curved may also be employed.

With reference now to FIGS. 3-5, in one embodiment of the method of the present invention, there is provided a receptacle 30 which has a flat bottom wall 32 from which extends perpendicularly side walls 34. Bottom wall 32 is provided with an opening 36 therethrough which may be threaded to receive a conduit connector. The conduit will be connected to a vacuum pump (not shown). Disposed on the bottom wall 32 are a plurality of spacers 38 upon which rests the bottom surface 40 of the block, when the block is disposed in the receptacle 30. The interior dimensions of the receptacle 30 are selected so that the side surfaces of the block 10 will be spaced a small distance from the side walls 34. In a preferred form of this embodiment, the height of the side walls should be such that the surface 28 of the locking groove 12 will lie substantially in the same plane as the flange 42 which surrounds the top of the receptacle 30. The space between edge 44 of flange 42 and edge 46 of the locking groove 12 is exaggerated in the drawings for the purpose of clarity, it being understood that this space may be as small as a few millimeters.

It should be understood that, where the article to be covered is shaped differently from the illustrated article, the receptacle's dimensions will be correspondingly altered. Also, where a smaller block is being used, segments may be inserted into the illustrated receptacle to reduce its interior volume to the appropriate dimensions.

With the block 10 disposed in receptacle 30 as illustrated in the drawings, and opening 36 connected to a vacuum pump with the pump being turned off or the connecting conduit closed by a valve, a heated sheet of thermoplastic material is draped over surface 14 of block 10 as illustrated in FIGS. 3 and 4. The thermoplastic sheet preferably is of the type that is normally stiff or rigid at normal room temperatures and should have a surface area such that it will completely cover surface 14 and extend outwardly far enough to overlap a portion of flange 42 on all sides of the locking groove 12. The sheet may be of a cast or extruded acrylic or extruded, rigid polyvinylchloride containing a solvent dispersed therein to render it thermoplastic. Plasticizers may also be employed. Sheet material made of acrylonitrile-butadiene-styrene (ABS) may also be used.

The thermpolastic sheet material is supported in a frame having clip means or other holding means about its interior periphery for engaging the sheet. The frame with the sheet is then inserted beneath or between banks of heaters to render the sheet deformable under very light pressure. For example, the sheet may be heated until it sags when the frame is supported in a horizontal plane beneath the heaters. A polyvinylchloride sheet having a thickness, for example, between 20 and 60 mils would be heated to a temperature of approximately 350° F. Of course, for other types of sheet material, different temperatures may be needed in the oven as will be apparent to those skilled in this art.

After being heated to the appropriate temperature the sheet material as indicated at 48 is quickly transferred from the oven and draped over the exposed surface of the block 14 and the top of receptacle 30 as illustrated in FIGS. 3 and 4. Where the sheet material has been heated while suspended in a frame as mentioned above, the frame carrying the sheet material may be lowered directly over the exposed block surface 14 and receptacle and the clip means holding the sheet released as the frame passes beneath the flange 42 of the receptacle. Immediately thereafter, a vacuum is pulled on the interior of the receptacle 30 through opening 36 while the thermoplastic sheet material 48 is hot and deformable. The resulting pressure differential between the ambient atmosphere and the vacuum within the interior of receptacle 30 will result in the deformation of the sheet material 48 whereby the sheet material will be forced into intimate contact with the surfaces of the locking groove 12 as illustrated in FIG. 5. Preferably, the interior of the receptacle 30 is rapidly evacuated after the sheet is draped over the block 10 so that the heat losses from the sheet material to the ambient atmosphere will be maintained at a minimum. As the thermoplastic sheet material cools its original rigidity will return yet the sheet material will retain its deformed configuration defined by the shape of locking groove 12. Cold air may be directed against the sheet 48 to accelerate hardening thereof. Subsequently the excess portions of the sheet material resting on flange 42 may be severed from that part of the sheet material in contact with the block 10 so that the resulting thermoplastic cover 48 will have the appearance as illustrated in FIGS. 6 and 7.

In FIGS. 8, 9, and 10, another embodiment of the present invention is illustrated.

In FIG. 8 there is shown a receptacle 50 having upstanding side walls 52 and 54 and a bottom wall or floor 56. Floor 56 is provided with spacers 58 similar to the spacers 38 described in the previous embodiment. In addition, an opening 60 is provided similar to that at 36 in the previous embodiment which is connected to a vacuum line 61. Additionally, a flange 62 surrounds the outer edges of each of the side walls 52 and 54 and floor 56.

In FIG. 9, a construction block 64 is illustrated disposed within the receptacle 50. Block 64 differs from the block 10 of the previous embodiment in that it has a groove 66 formed in three sides of the block 64 whereas, in the previous embodiment four sides of the block 10 were provided with the locking groove. It should be noted that with the block 64 placed in the receptacle 50 as illustrated in FIG. 9, the groove 66 will be exposed outwardly of flange 62 to receive the thermoplastic sheet material when a vacuum is drawn through conduit 61 and opening 60.

A modified three-sided frame carrier for the sheet material may be employed to support a thermoplastic sheet in the dotted line configuration illustrated at 68 to assure that each of the exposed sides of the block 64 will be covered by a thermoplastic sheet prior to the application of the vacuum through line 61.

Figure 12:
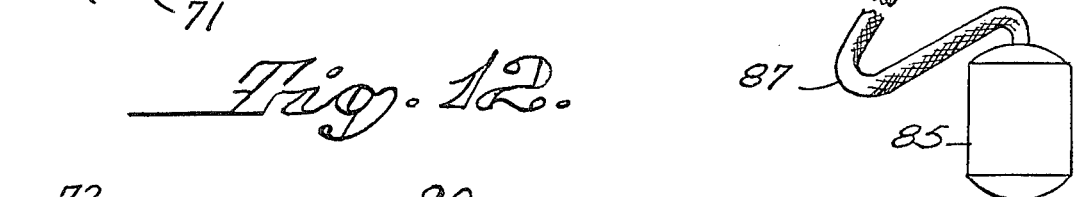
FIG. 12 is a view taken along lines 12—12 in FIG. 11 with portions deleted for clarity.
Figure 13:
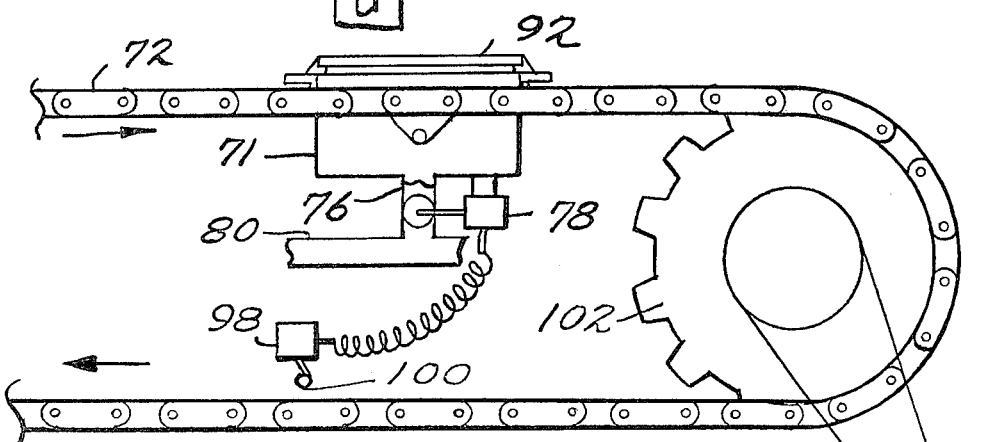
FIG. 13 is a detailed side view of one end of the conveyor system used in the process illustrated in FIGS. 11 and 12.

In FIGS. 11, 12 and 13, another embodiment of an arrangement for carrying out the method of the present invention is illustrated wherein an endless conveyor continuously moves individual blocks located in receptacles similar to the receptacle 30 illustrated in FIGS. 3, 4 and 5 of a previous embodiment, discussed above.

In FIG. 11, a plurality of identically shaped receptacles indicated at 71 are suspended between parallel belts or chain of an endless conveyor 72. The bottom wall 74 of each receptacle 71 is provided with the usual spacers similar to those shown at 38 in the previous embodiment as well as a connector conduit 76 which carried a solenoid operated valve 78. The conduit 76 is joined to a flexible tubular conduit 80 which is mounted on pulleys 82 and 83 one of which may be driven so that the conduit 80 will move at the same linear velocity as the main endless conveyor 72.

A vacuum pump 85 is connected through a flexible conduit 87 to the conduit 80 through a rotary union. Conduit 87 should be of sufficient length so that it can traverse the entire length of the conveyor 72 as conduit 80 moves about pulleys 82 and 83. The rotary union may be of a conventional type and is provided to prevent the conduit 87 from twisting on itself during the course of its travels about the path of the endless conveyor 72. With this arrangement, a vacuum will be maintained in conduit 80.

In FIG. 11 at Station A, blocks similar to that illustrated in FIG. 1 are inserted into an empty receptacle mounted on the moving conveyor 72. At Station B, an extrusion device 90 is disposed above the conveyor 72 and which is of the type that will extrude plastic sheet material as at 92. Preferably, the extrusion device 90 is of the type that will operate continuously by receiving thermoplastic material at one end through a hopper as at 93, melting the plastic material and force feeding it by means of a screw to the dicharge end of the device. Conventional types of controls, of course, would be required to maintain uniform thickness and density of the extruded sheet material. The sheet material 92 as it leaves the extrusion device is deformable due to the heat employed to melt the raw plastic material. As shown in FIG. 12, the width of the sheet material 92 is sufficient to cover the exposed surface of the block passing thereunder. A cutting device indicated at 94 in phantom lines is provided to sever the edges of the sheet material as the block moves from station C to Station D. Before the severing, the solenoid actuated valve 78 is opened to evacuate the interior of the receptacle 71 at Station C so that the deformable plastic sheet material will be pulled into the locking groove formed about the periphery of the block 10. Limit switches may be suitably employed to operate the solenoid valve 78 and maintain this valve open at Station C and as the receptacle moves to Station D. As previously noted, cooling air may be blown onto the surface of the block to rapidly cool the sheet material to accelerate its hardening. At Station D, suitable severing mechanisms as at 96 can be employed to cut away the plastic sheet material transversely of the path of the conveyor 72, and at Station E the covered block is removed by suitable means from its associated receptacle.

In FIG. 13, there is illustrated a more detailed arrangement of the foregoing system as well as the solenoid valve which, in FIG. 13 is shown connected to the bottom of the receptacle 71 adjacent the connector conduit 76. A limit switch 98 is disposed so as to be operable by an abutment member 100 suitably connected to a fixed portion of the conveyor 72 or other support for operating the solenoid valve 78. Also, the two belts or chains of the conveyor 72 may be driven by the usual sprocket wheel 102 which is connected to a power source 104. It will be readily apparent that other types of conveyor drive means may be employed and that the conveyor system need not rotate about a horizontal axis as illustrated in FIG. 11 but may be arranged so that the receptacles are arranged about the circumference of a circle or the perimeter of a loop disposed to rotate about a vertical axis.

With the foregoing arrangement, the method of the present invention can be carried out continuously to attain high production rates which will correspondingly reduce the costs of manufacturing construction blocks with protective thermoplastic covers.

While the foregoing description has been of preferred embodiments, numerous modifications thereof can be usefully employed. For example, if desired, only opposite sides of a block may be covered with a thermoplastic sheet by simply providing two sets of locking grooves similar to that shown in FIG. 2 at 12. Additionally, to prevent moisture from collecting between thermoplastic cover or covers and the surface of the block where the block is to be employed in a moist environment, a non-thermoplastic liquid barrier of dimensions substantially equal to the surface area of the portion of the block that is to be exposed to the moist environment may be disposed on the surface of the block before the thermoplastic cover is applied. The thermoplastic cover, when applied, will maintain the moisture barrier member in place. Alternatively, a sealer may simply be applied to the surface of the block before the thermoplastic cover is secured thereto.

The blocks of the illustrated embodiments will have particular application in the construction of swimming pools where the surface of the walls of the swimming pool are formed with the surfaces 14 of the block 10 having the thermoplastic covers 48 and 92 secured as desribed above.

Having described the invention, what is claimed is:

1. A method of continuously securing a covering of thermoplastic sheet material to a surface of individual masonry blocks each of which has a plurality of surfaces and a groove formed in the surfaces extending from the surface to be covered, said groove being formed about the exterior of said block, comprising the steps of:
    a. providing a series of receptacles carried on conveyor means, each receptacle having an opening and dimensions such that a space is provided between the walls of each said receptacle and the surfaces of a block,
    b. disposing a said block in a said receptacle with the surface to be covered and said groove of each block projecting out of said opening in the receptacle at a first station,
    c. continuously moving the receptacles carrying said blocks beneath means for supplying a heated thermoplastic sheet material at a second station,
    d. continuously draping said heated thermoplastic sheet material over a said block and opening of a said receptacle as said block and receptacle move through said second station,
    e. drawing a vacuum on the interior of a said receptacle at a third station which is downstream of said second station whereby portions of said heated sheet material will be pulled into contact with a said groove of a said block at said third station,
    f. subsequently, severing excess sheet material at a fourth station, and
    g. then removing each block from its associated receptacle at a fifth station.

2. The method as claimed in claim 1 including the step, at said second station, of continuously extruding said sheet material from a sheet extrusion device disposed vertically above said conveyor means.

* * * * *